May 3, 1966  A. L. COURTNEY  3,249,484
APPARATUS FOR MAKING FLAT TAPE OF RESIN COATED FILAMENTS
Filed Dec. 11, 1961  5 Sheets-Sheet 1

INVENTOR.
ALBERT L. COURTNEY
BY
ATTORNEY

May 3, 1966  A. L. COURTNEY  3,249,484
APPARATUS FOR MAKING FLAT TAPE OF RESIN COATED FILAMENTS
Filed Dec. 11, 1961  5 Sheets-Sheet 2

INVENTOR.
ALBERT L. COURTNEY
BY
ATTORNEY

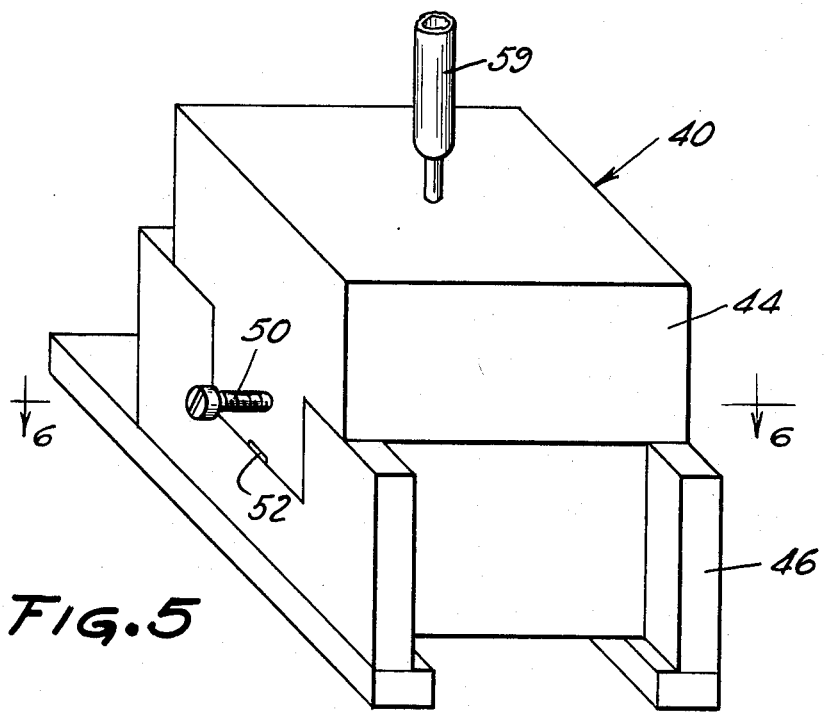
FIG. 5
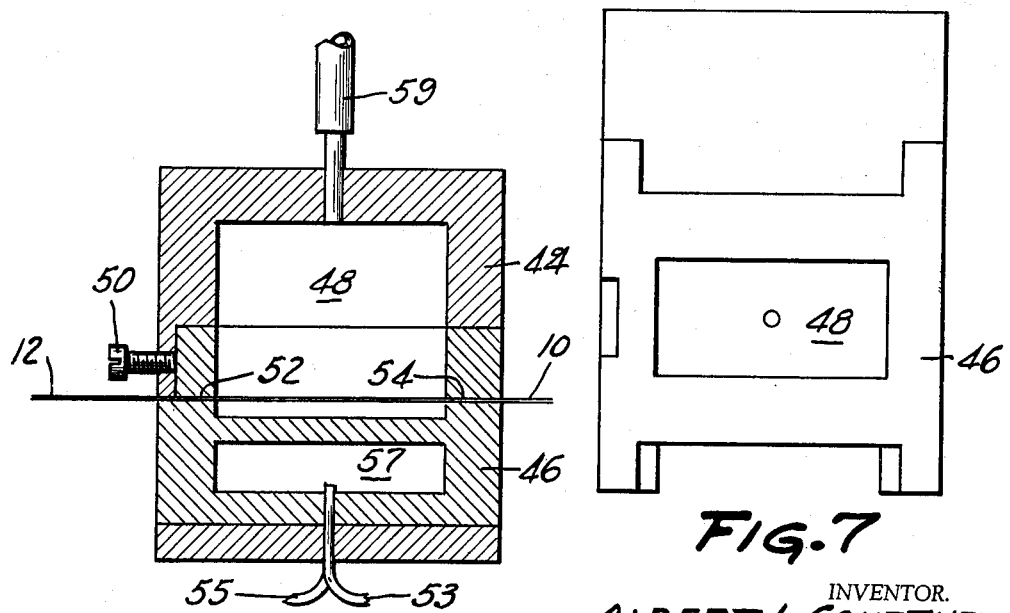
FIG. 6
FIG. 7
INVENTOR.
ALBERT L. COURTNEY
BY
ATTORNEY May 3, 1966 A. L. COURTNEY 3,249,484
APPARATUS FOR MAKING FLAT TAPE OF RESIN COATED FILAMENTS
Filed Dec. 11, 1961 5 Sheets-Sheet 5

INVENTOR.
ALBERT L. COURTNEY
BY
ATTORNEY

United States Patent Office 3,249,484
Patented May 3, 1966

3,249,484
APPARATUS FOR MAKING FLAT TAPE OF RESIN COATED FILAMENTS
Albert L. Courtney, South Bend, Ind., assignor to The Bendix Corporation, South Bend, Ind., a corporation of Delaware
Filed Dec. 11, 1961, Ser. No. 158,236
5 Claims. (Cl. 156—441)

This invention relates to a method and mechanism for making flat tape and more particularly to a method and mechanism for manufacturing tape to be used in making structures, such as, but not limited to, pressure vessels of the "generated" type, as described and claimed in U.S. application Serial No. 38,218 filed June 23, 1960, in the name of A. L. Courtney and entitled "Tape Winding Machine" (now Patent No. 3,140,058).

Accordingly, it is an object of this invention to provide a method and a mechanism for forming a thin tape from a plurality of coated filaments arranged in parallel relationship.

Another object of the invention is to provide a process for the manufacture of a tape or strand in which a novel step comprises the method of arranging and inter-relating the filaments incorporated in the product.

It is also an object of this invention to provide a self-cleaning roller die means to maintain a plurality of filaments in a collinear relationship and prevent them from crisscrossing.

Still another object of the invention is to provide a resin chamber through which the filaments pass which chamber may be both heated and/or pressurized to expedite the bonding of the resin to the filaments.

It is a further object to provide a carrying or back-up means for a tape of reinforced filaments to prevent the tape from roping.

A still further object is to provide a gathering device for maintaining the collinear relationship of said filaments during interruptions in tape manufacture.

Others objects and many of the attendant advantages of this invention will be readily appreciated as the same becomes better understood by reference to the following detailed description when considered in connection with the accompanying drawings in which:

FIGURE 5 is a perspective detail of the resin tank for coating the filaments as they are drawn therethrough;

FIGURE 6 is a sectional view along line 6—6 in FIGURE 5;

FIGURE 7 is a plan view of the understructure of said tank;

FIGURE 10 represents the spaced apart spools of FIGURE 1 and the mounting means therefor.

Figure 1:
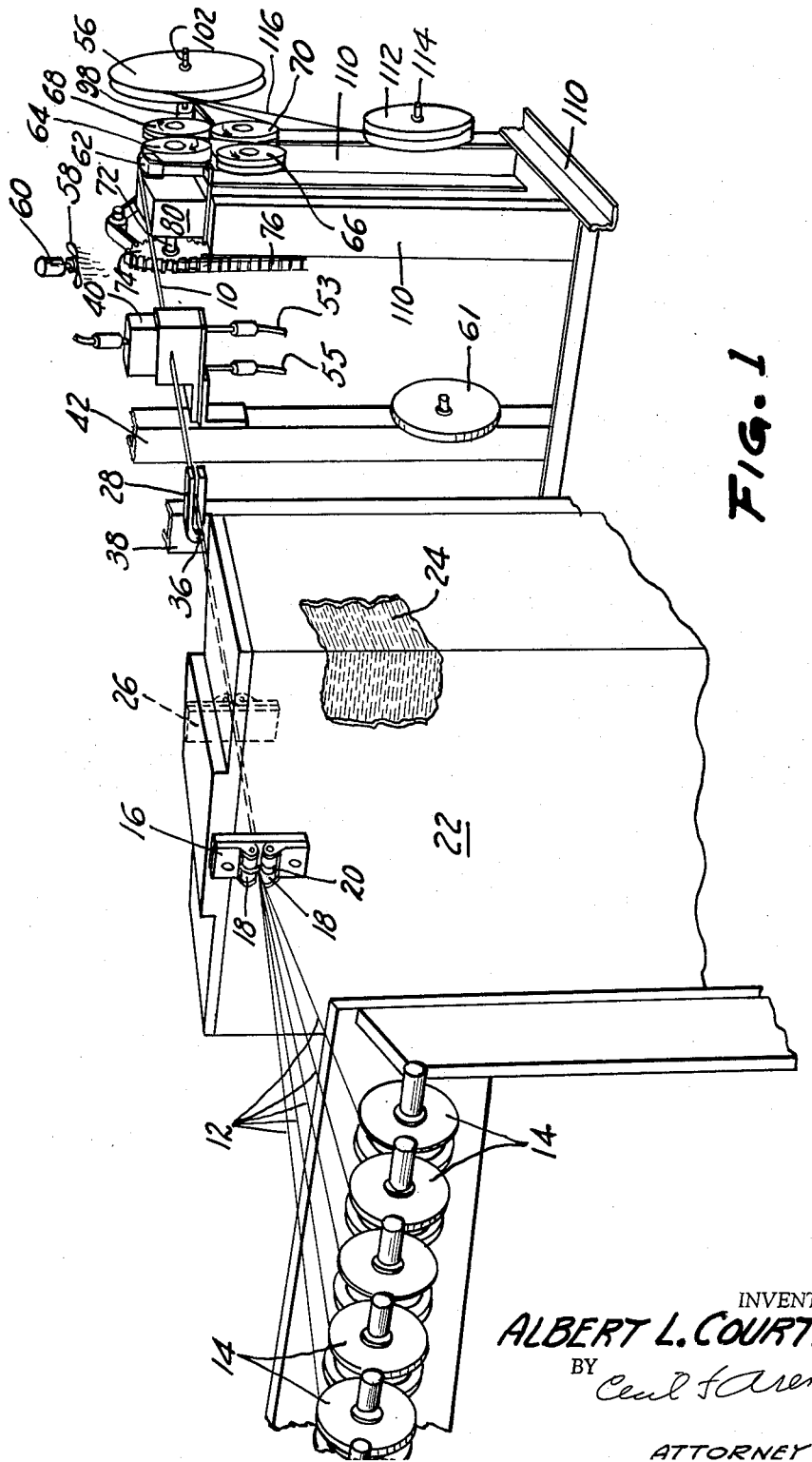
FIGURE 1 is a perspective view showing the mechanism employed in making the article made in accordance with this invention and having a cut-away view to show the contents of one of the tanks presented thereby.
Figure 2:
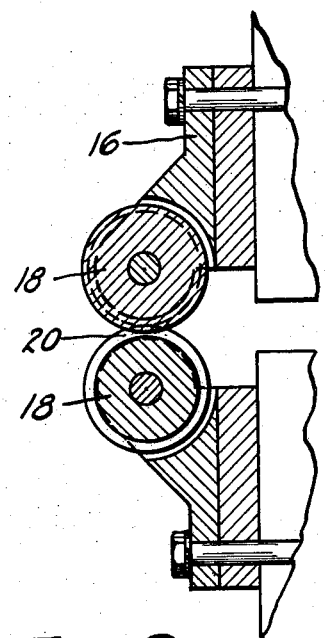
FIGURE 2 is a section along line 2—2 of FIGURE 3 of the roller detail for aligning a plurality of filaments substantially horizontal and adjacent to each other.
Figure 3:
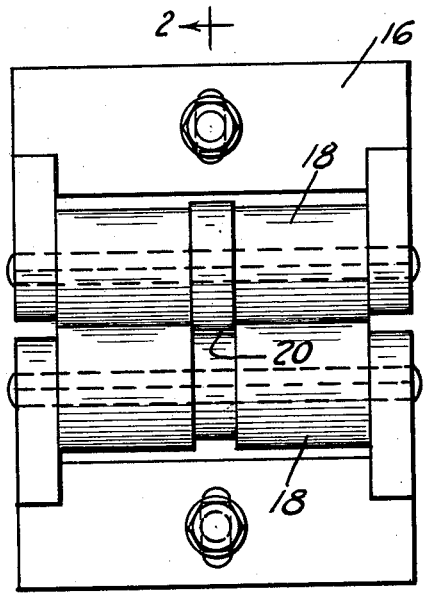
FIGURE 3 is an end view of this same roller detail.

In the preferred process of making the tape or strand 10, individual filaments 12 are drawn from spaced spools 14 which are mounted for free rotation. The spools 14 are each rotatably mounted on associated bearing members 15 which permit the filaments 12 to be drawn uniformly from the spools 14. The filaments may assume a circular, rectangular or other geometrical section and may be glass or wire filaments. As for wire, the smaller diameter wire is advantageous because tensile strength of wire increases with size reductions because of cold working of the metal which occurs while it is drawn into the small diameter form. The drawing process appears to orient the crystal grains in such a manner that the metal exhibits greater tensile strength.

When using a wire filament, we are referring to a monofilament. As for a glass filament, we are referring to a strand or yarn. The term strand is used above and hereinafter when all the glass monofilaments are gathered together in a straight line, (no twisting). If the glass filaments are twisted, (such as is the case where it is desired that the filaments do not separate when tension is relaxed) the glass filaments are in the form of a yarn; and a typical twist is one torsional turn per linear inch of material.

The filaments 12 are next passed through a die 16 having rollers 18 prescribing a slot 20 centrally thereof which is only slightly larger in width than the combined dimensions of all the filaments, the rollers being of the self-cleaning type. Thus, for a tape consisting, for example, of 49 wire monofilaments each having .004 diameter, the slot 20 is .200 inches in width so that the wires are aligned in a side-by-side relation. Considering the same filament type the thickness of slot 20 is .0045 so that all of the filaments are gathered in a single plane and cannot cross one over the other. As may be readily appreciated, when using glass filaments the slot 20 is sized to maintain the glass filament strands or yarn in a collinear and parallel arrangement and not each glass monofilament.

As the filaments emerge from the die 16, they are all collinear and are spaced closely together in accordance with the proper width desired for the tape 10.

The filaments 12 may be thereafter passed through a cleaning tank 22 having a trichlorethylene 24, or the like, therein which removes contaminants, such as grease, oil, dirt, etc. This process and the solution utilized is dependent in part on the type of filament and the way in which it is supplied. The inlet and outlet openings in said tank 22 are accurately sized to the dimensions of the filaments 12 so that none of the filaments become disarranged whether they are monofilaments or strands or yarn. To further insure a maintenance of filament positioning, another gathering die 26, similar in detail to the gathering die 16, may be placed adjacent the outlet opening of the tank 22.

Figure 4:
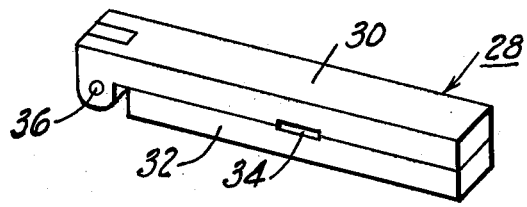
FIGURE 4 is a perspective view of the bar detail for maintaining the filaments in a substantially horizontal and parallel relationship.
Figure 4A:
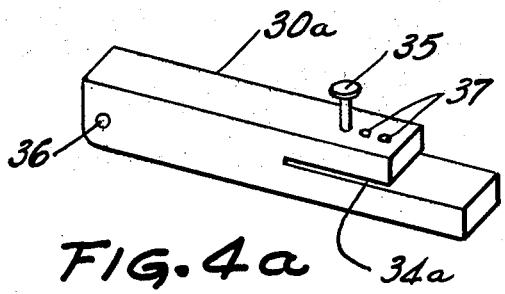
FIGURE 4a is a perspective view of the modified bar detail for maintaining the filaments in a substantially horizontal and parallel relationship.

Following the cleaning tank 22 is a further gathering bar 28 having a pivotable upper bar 30, a fixed bar 32 and a slot 34 comprised of a cut-out in bar 30 and cut-out in bar 32 so that the slot formed by joining the bars 30 and 32 is properly dimensioned to retain the filaments in their proper relative location. The upper bar 30 is pivotable about a pin 36 extending from a vertical stanchion 38. Another type of gathering device could be in the form of an appropriately slotted bar 30a of FIGURE 4a with an end opening 34a into which the filaments may be placed with a removable pin 35 to hold them therewithin. The bar 30a has a number of drilled holes 37 to accommodate said pin 35 and thus allow for varying filament widths In any event, the function of this bar is to hold the filaments in their proper positions when the process of manufacturing is interrupted to save the gathering and aligning thereof when the process is restarted.

From the cleaning tank 22, if one be used, the filaments are passed through an applicator tank 40, herein shown to be mounted to another vertical stanchion 42. If the cleaning tank is eliminated, the aforementioned roller die 16 could be located on an applicator tank 40. The applicator tank 40 contains a liquid resin material which adheres to the filaments 12 and comprises an upper housing 44 and a lower housing 46 that encloses a chamber 48 when mated and joined, as by the set screw 50. Openings 52 and 54 are provided in the walls of the applicator tank 40. Opening 52 is sized to be the same as the slot 20 of die 16, aforementioned, to permit the continuous travel of the filaments while grouping them in a single plane and eliminating entanglement thereof; whereas opening 54, through which the filaments that have been coated exit, is precisely sized to the final dimension of the tape or strand 10 so that excess resin is retained within the tank 40 and the filaments are spaced the exact distance apart with none of them lying crisscross relative to each other.

In addition, the applicator tank is adapted to have steam or hot water circulated through it and supplied by conduit 53 and exhausted by conduit 55. The inner detail of the tank shows a double boiler arrangement with a chamber 57 to provide uniform heating of the resin chamber 48. The chamber 57 may also be pressurized to increase the bond of the resin to the filaments, with conduit 59 serving as the pressure supplying means. The motion of the tape seals the chamber 48 when it is to be pressurized, at least as to the slot 52; and as the slot 54 is really an extruding die, the thick resin scraped off the tape serves to seal that chamber opening. The pressurization of the chamber is undertaken when a high viscosity resin is utilized.

The tape must be kept flat across its width at all times or else the individual filaments are stressed non-uniformly at the time they are wrapped onto a storage reel 56 or over a mandrel such as in the copending application No. 38,218 or copending application No. 825,958, filed July 9, 1959, in the name of W. E. Eldred and entitled "Tape and Wrapped Rocket Case" (now Patent No. 3,189,510), if it is desired to fabricate an article directly from the tape formed as by the subject invention. In order to accomplish such a flat condition, the wires are maintained, as described, at all times in a side-by-side relation. Also, the tension on the tape is distributed equally as it passes through the cleaning tank 22, dies 16, 26, 28 and applicator tank 40 by drive means to be described.

A typical resin for the applicator tank 40 which has been found satisfactory for making the tape is as follows, the materials being in parts by weight:

60 parts Shell 1031 Epon (trade name for a mixture of isomers and homologues of epichlorohydrin-bisphenol A type solid epoxy resins)
30 parts Shell 828 Epon (trade name for epichlorohydrin-bisphenol A type liquid epoxy resins)
10 parts 3M Cordolite (Flexing Agent) (trade name for Epoxidized Cashew Nut Oil)
1 part Boron Trifluoride Monoethylene Amine (hardening agent).

This plastic composition will melt at about 212° F. and may be applied to the tape at this temperature. It should be noted that this plastic material is not critical and is only one of many suitable plastic binders. In addition, the resin or binder should be a heat resistant material, and good results along these lines have been obtained with a combination of phenolic-epoxy-elastomeric composition. Some of the general considerations to be taken into account in selecting a suitable resin are that the curing temperatures do not damage the particular filament characteristics. If this is exceeded, then the strength properties of the filaments, and in particular wire filaments, may be reduced. Therefore, the binder mentioned having the 1 part hardening agent requires only about 400° F. to polymerize the resin binder which was well below the draw temperature of said filaments. Thus, it is readily appreciated that the only critical feature, as concerns the resin, is the draw temperature of the monofilaments, strands or yarns used.

As the tape 10 emerges from the applicator tank 40, it may be cooled, as by a fan 58 driven by a motor 60, so that the temperature of the tape is quickly reduced to room temperature (about 72° F.). Tests have shown the tape 10 to be fully cooled within two feet of travel from the applicator tank when the tape is moving at about 16 feet per minute. It is to be noted that this distance of travel for cooling tape 10 should be kept as low as possible and therefore other cooling means may be readily substituted to minimize the cooling distance required. In addition, heating is necessary to some resins to remove the thinner. When heat is to be applied to the filament reinforced tape, it is preferable to apply a supporting film to the tape immediately to prevent its natural tendency to rope. The supporting film will be of the type to permit ready separation from the tape when said tape is to be used as in the wrapping of a rocket case or the like and may be supplied from a reel 61 that may be, as shown, mounted on stanchion 42.

Figure 9:
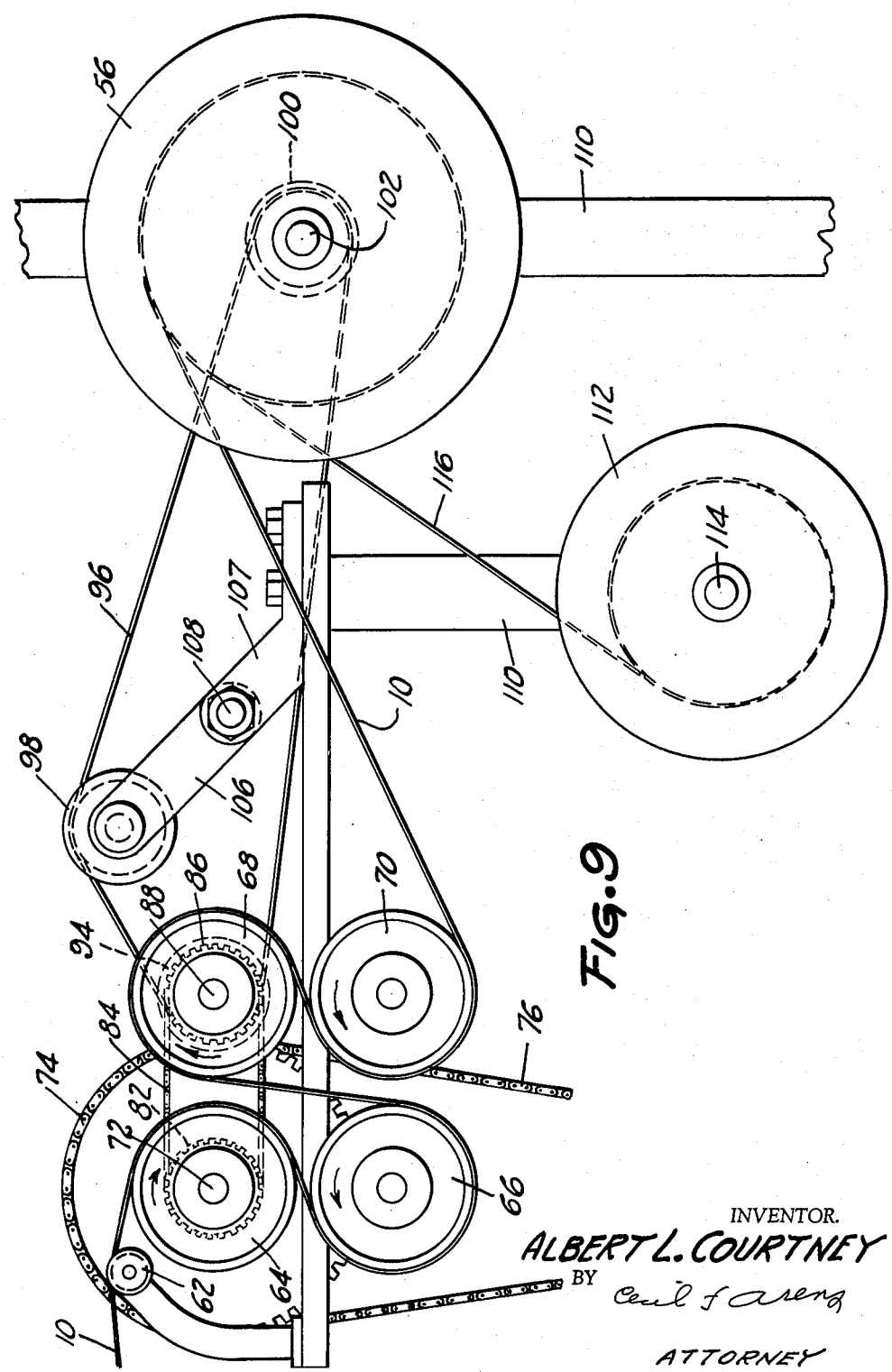
FIGURE 9 is an end view of said drive assembly.

After being cooled or heated, as the case may be, the tape is directed over a guide roller 62 to a plurality of rollers 64, 66, 68 and 70 herein depicted as numbering four in a preferred form of this process which function as a friction drive means for said tape to materially simplify the drive mechanism for said tape. The rollers 64, 66, 68 and 70 rotate in opposite directions, as indicated by the arrows in FIGURES 1 and 9, and as is also the case of guide roller 62, are coated with a parting agent to prevent adherence of the tape 10 to the rollers 62, 64, 66, 68 and 70. Such a parting agent may be in the form of a Teflon coating (polytetrafluoroethylene).

Figure 8:
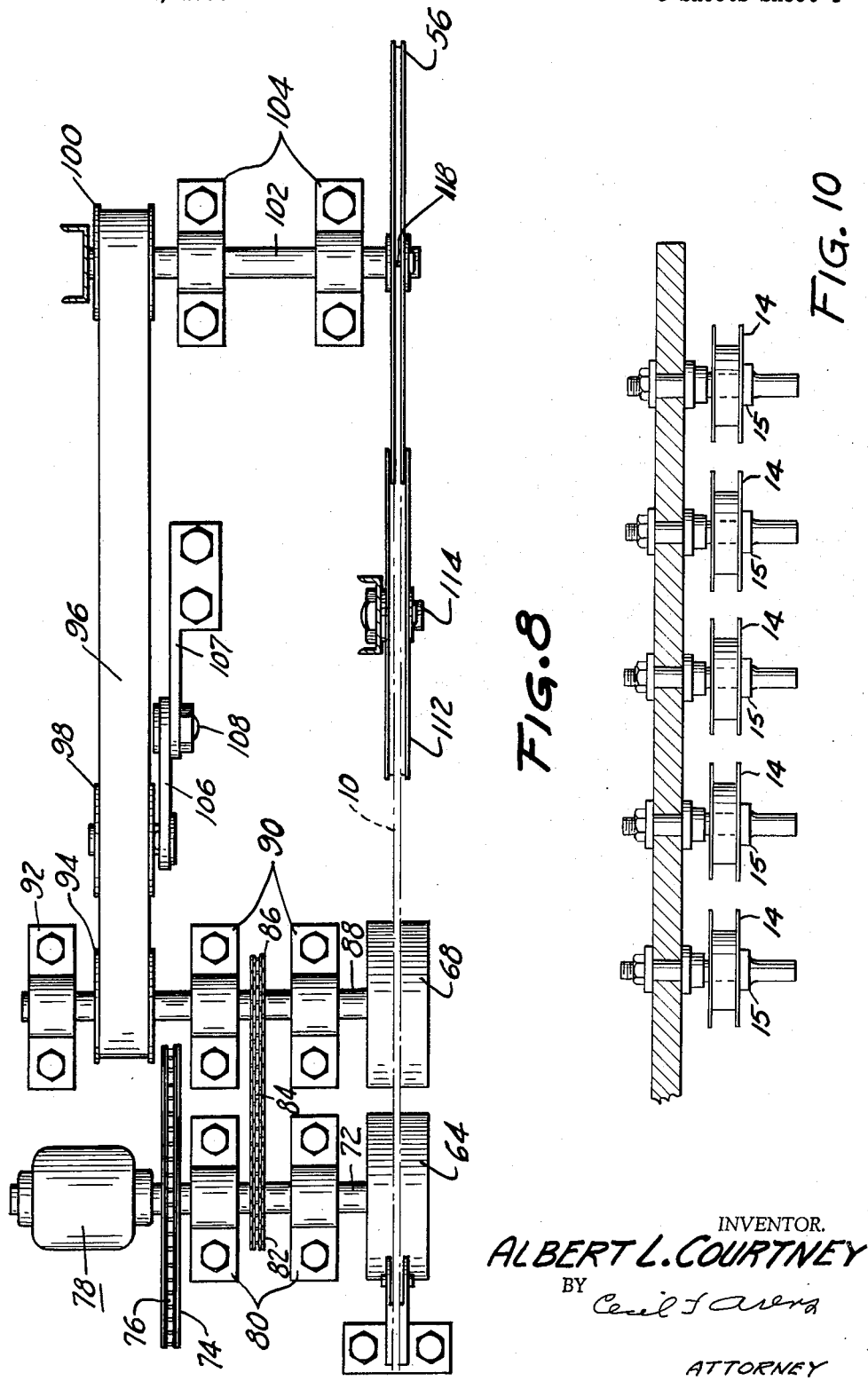
FIGURE 8 is a plan view of the drive assembly for the tape and take-up reel therefor.

The roller 64 is directly driven by shaft 72 to which it is affixed. A sprocket 74 or similar mechanism is driven by a chain 76 or similar means that is connected to a motor 78 shown in FIGURE 8. The sprocket 74 is suggested as being of a large diameter. However, the diameter of sprocket 74 is chosen to permit a selection of the speed of rotation of shaft 72 to that desired to draw the tape 10 through the aforementioned processes and to permit the proper travel during the heat exchange operations as above described. Shaft 72 is held by the spaced journals 80 and mounts another sprocket 82 or similar driving connection. Said last named driving connection is connected by a chain 84 to a similar sprocket or driving member 86 affixed to a shaft 88. Shaft 88 is similarly journaled, as by pillow blocks 90 and 92, for rotation and drives roller 68 to provide a friction drive for tape 10 that in turn rotates rollers 66 and 70 in accordance with the rotation of driven rollers 64 and 68.

In addition, shaft 88 has mounted thereto a pulley or similar drive mechanism 94 for driving a belt 96 that is properly tensioned by an adjustable idler mechanism 98 and wrapped around a pulley or similar driven member 100 to drive a shaft 102 that is mounted for rotation by spaced journals 104. The adjustable idler roller 98 is held in the desired position to accomplish non-slip driving of member 96 by a system of links comprising a link 106 and a link 107 that are held together at the proper angular relationship to accomplish the foregoing by a connecting means 108.

Shaft 102 also is connected with the reel 56 to rotate same and is rotatably held by framework 110 which also forms the support for a reel 112 that is mounted thereto as by a shaft 114 in such a manner as to permit free rotation of the reel 112. The reel 112 is provided with thin layers of Mylar tape (polyethylene-terephthalate) 116 or other suitable material which is to be drawn by reel 56 to be placed between layers of the tape or strand 10 of bonded filaments to prevent adjoining tape layers from sticking together and interfering with its usage when it is subsequently desired for wrapping a pressure vessel, for example, such as is depicted by said copending application No. 825,958. Such a Mylar tape could be utilized when the heating operation above mentioned is utilized to overcome the natural tendency of the tape to rope as well as to prevent the sticking of adjoining tape layers aforementioned.

In operation, the motor 78 is energized to drive the sprocket 74 at the desired revolutions per minute which, in turn, drives the rollers 64 and 68 as well as the reel 56. Reel 56 then starts to draw the tape 10 thereon while simultaneously drawing the Mylar tape 116 or other suitable material thereunder after the ends of said tapes have been placed in slot 118.

The rollers 64 and 68 in cooperation with rollers 66 and 70 draw the tape or strand 10 from the applicator tank 40 through the cooling air provided by fan 58 and consequently draw the filaments 12 from their spools 14 through the cleaning tank 22 and the dies 16, 26 and 28 at the proper tension and rate of speed.

It is to be understood that the present invention is not limited to forming the filaments into any particular width tape, as the tape may be formed in various widths and stored pending future usage. Nor is it the intent to limit this invention to the use of a storage reel, for this invention may be applied to systems where the tape is wound directly after it is formulated.

It is therefore to be understood that within the scope of the appended claims the invention may be practiced otherwise than as specifically described.

What is claimed is:
1. A mechanism for manufacturing a resin coated filament reinforced tape comprising in combination:
   a plurality of spools having filaments wound therearound;
   a mounting means for said spools for permitting uniform rotation thereof;
   a grouping means adapted to receive said filaments from said plurality of spools for gathering said filaments in parallel spaced apart relationship;
   tank means adapted to receive said filaments from said grouping means and containing the resin for application to said filaments;
   a first slot formed in one wall of said tank through which said filaments enter said tank and move therethrough in spaced apart parallel relationship;
   a second slot formed in an opposite wall of said tank through which said filaments coated with resin leave said tank in the form of a tape sized according to the cross sectional area of said second slot;
   means including first and second pairs of rollers operatively connected to said tape for drawing the same through said tank at uniform speed and tension;
   said tape passing between each of said first and second rollers and contacting a substantial portion of the periphery of each roller therein;
   driving means operatively connected to one roller in each of said first and second pairs of rollers for driving the same at uniform speed; and
   means for pressurizing the interior of said tank means to increase the bond of the resin to the filaments passing therethrough.

2. A mechanism for manufacturing a resin coated filament reinforced tape as set forth in claim 1 and further including:
   a cleaning tank containing a cleaning solution intermediate inlet and outlet openings through which said parallel spaced apart filaments are passed prior to entering said resin containing tank means;
   said parallel spaced apart filaments being washed free of contaminants by said cleaning solution to thereby promote adherence of said resin to the filaments.

3. A mechanism for manufacturing a filament reinforced tape as set forth in claim 1 wherein:
   said grouping means includes at least one roller die means for gathering said filaments in parallel spaced apart relationship.

4. A mechanism for manufacturing a filament reinforced tape as set forth in claim 3 wherein:
   said roller die means includes a pair of coacting rollers defining a slot having a height and width slightly greater than the height and total width, respectively, of said group of filaments which are passed therethrough.

5. A mechanism for manufacturing a filament reinforced tape as set forth in claim 1 wherein:
   said tank means is heated by a fluid.

References Cited by the Examiner

UNITED STATES PATENTS

| | | | |
|---|---|---|---|
| 787,886 | 4/1905 | Anet | 156—441 |
| 1,132,837 | 3/1915 | Eggleston | 156—441 |
| 2,328,066 | 8/1943 | Drew | 154—53.5 X |
| 2,794,480 | 6/1957 | Crawford et al. | 156—441 |
| 2,979,431 | 4/1961 | Perrault | 143—53.6 |
| 3,034,566 | 5/1962 | McKay | 156—180 XR |
| 3,042,569 | 7/1962 | Paul | 156—180 |
| 3,052,584 | 9/1962 | Smith | 156—181 |

EARL M. BERGERT, *Primary Examiner.*

R. J. CARLSON, P. DIER, *Assistant Examiners.*